Oct. 26, 1937.    F. R. DUNN    2,097,401
STEAM TRAP
Filed Feb. 15, 1935    2 Sheets-Sheet 1

Inventor
FREDERICK R DUNN

By Edmund H. Parry Jr.
Attorney

Oct. 26, 1937.  F. R. DUNN  2,097,401
STEAM TRAP
Filed Feb. 15, 1935  2 Sheets-Sheet 2
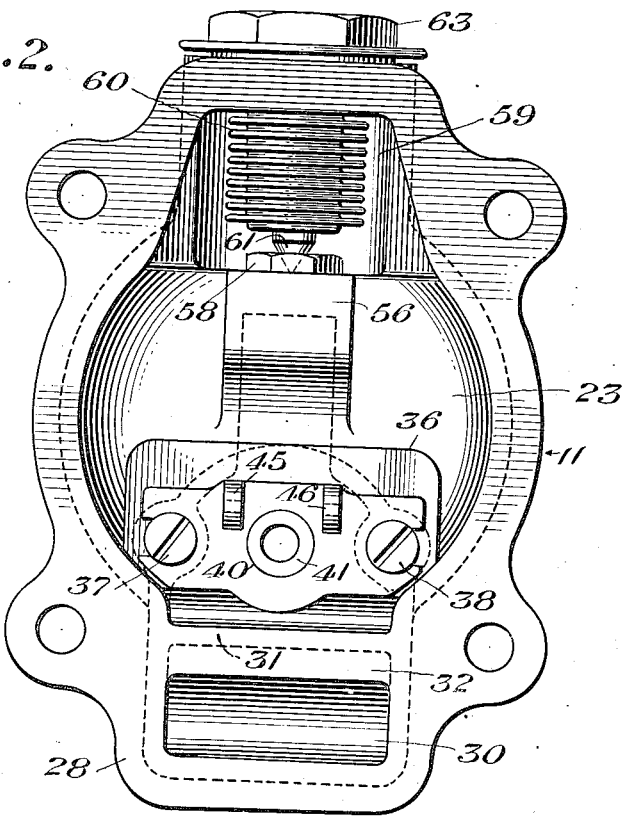
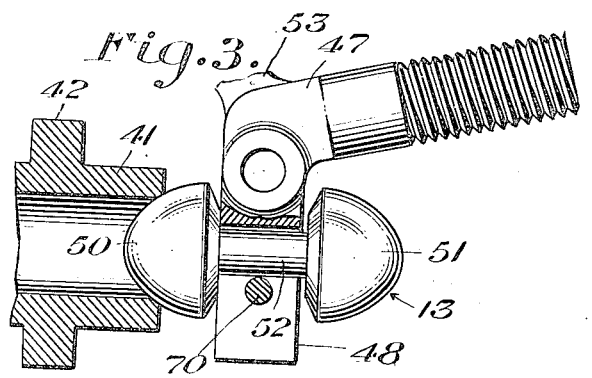
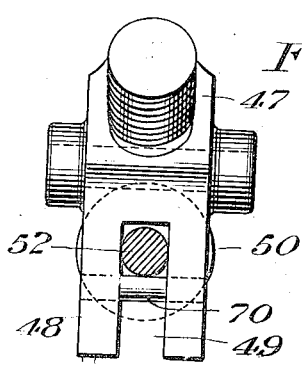
Inventor
FREDERICK R DUNN
By Edmund H. Perry Jr.
Attorney Patented Oct. 26, 1937

2,097,401

UNITED STATES PATENT OFFICE 2,097,401

STEAM TRAP

Frederick R. Dunn, Lockport, N. Y., assignor to American District Steam Company, North Tonawanda, N. Y., a corporation of New York Application February 15, 1935, Serial No. 6,733

2 Claims. (Cl. 236—53)

This invention relates to steam traps such as are variously used to remove condensation from steam distribution systems; to prevent entrance of steam to condensation meters; and on the outlet of heaters or other heat transmission equipment. In pressure systems the trap may be of the gravity or drip type, while in vacuum heating systems a thermostatically controlled trap should be used.

One object of the present invention is to provide a steam trap having universal application which may be used in either pressure or vacuum heating systems and which is so constituted that it may operate both as a simple drip trap and as a thermostatically controlled trap.

I further propose to provide a trap which may be converted from the drip type to the thermostatic type, or the reverse, by the simple and quickly accomplished expedient of inserting or removing a single operating element.

Another object of the invention is to provide a steam trap of extremely compact form but having a considerable capacity in relation to its overall dimensions so that it will require only a small space yet serve a system requiring an ordinary trap of much larger size.

A further object of the invention is to provide a steam trap of extremely rugged construction both in its main structure and operating parts which may be economically manufactured and sold at a low price for universal use.

Still another object of the invention is to provide a trap which may be opened for cleaning or repair without disconnecting the same from the heating line, and in which all operating parts are carried by a single section of the casing so constructed that when it is removed all the parts are exposed and rendered accessible.

To prolong the operating life and efficiency of the trap it is further proposed to provide in the trap a novel arrangement of the valve and valve seat. The valve and seat are preferably of a reversible type, some forms of which are already known to the art, but the particular construction and mounting of the proposed elements is novel and offers advantages both in wearing qualities and efficiency of operation over prior types.

With the above and other objects in view the invention includes a combination and arrangement of parts illustrated in one practical embodiment of the invention of the accompanying drawings, wherein:

Fig. 2 is an elevation from the inside of the removable side portion of the trap of Fig. 1 which carries all operating parts, but from which certain parts have been removed for clarity;

Fig. 3 is a detailed view of the valve and valve seat;

Fig. 4 is an end view of the valve mounting shown in Fig. 3;

Figures 1, 5:
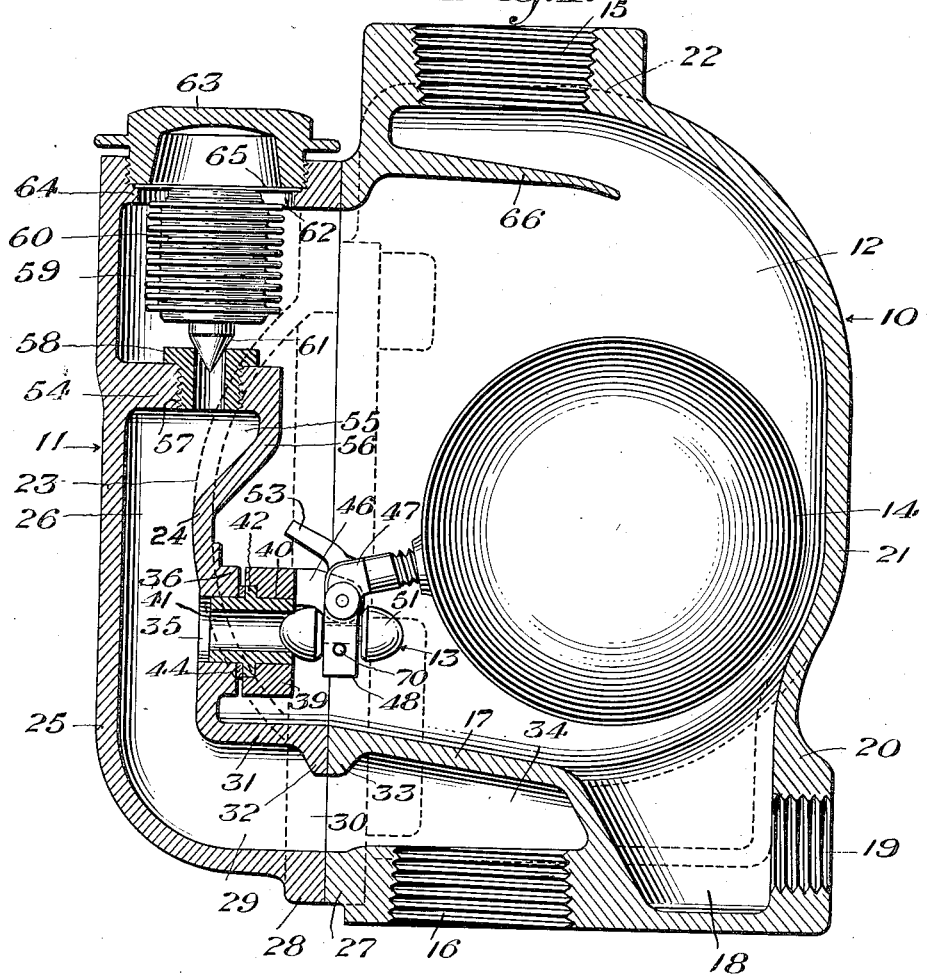
Fig. 1 is a view in central vertical elevation of the new trap and showing all operating parts.
Fig. 5 is a perspective of the detachable mounting for the valve seat which also supports the valve and its operating mechanism.

The trap comprises a main body portion 10 and a removable end cover unit 11. The body portion houses a trap chamber 12 of generally rounded contour but having no accurately definable shape. As conventionally the chamber houses a valve 13 and its spherical float control 14, hereafter to be described, and by reference to Fig. 1 it will be observed that the shape is such as to provide adequate space for the operation of the float and the mounting of the valve, maximum available space in relation to the size of the trap, and the greatest possible capacity for the minimum overall trap dimensions.

The inlet port 15 to the chamber 12 is located in the central top area of the main trap body 10. To enable simple connection of the trap in a heating line the discharge outlet 16 is located at the bottom of the trap in vertical alignment with the inlet 15 but the same is separated from the trap chamber 12 by the chamber bottom wall 17. As will be seen in Fig. 1 the outlet 16 communicates with a horizontal passage underlying the trap chamber and this in turn connects with a vertical continuation located in the removable cover unit 11 and having a horizontal opening in its wall controlled by valve 13 through which liquid is discharged from the chamber 12 for conduction to the outlet 16, all as further to be explained.

The chamber bottom wall 17 has a downward slope leading to a depending well 18 which increases the capacity of the trap and which must be filled during operation of the trap before the level of condensate rises sufficiently to lift the float and open the valve 13. A blowout port 19 is provided in the end wall 20 of the well. The end wall 21 of the chamber 12 curves upwardly from the well and at its upper area is rounded to merge with the top 22 and opposite curved side walls of the chamber.

Projecting laterally beyond the central vertical portion of the opposite concave end wall 23 of the chamber 12 is an extension structure having inner and outer spaced walls 24 and 25 which define a vertical discharge throat or passage 26. The chamber end wall 23 and the extension structure are constructed to constitute the cover unit 11, which as best seen in Fig. 2 is removably mounted by bolt connections on the main trap body 10 through abutting flanges 27 and 28. The walls of the vertical throat 26 of the cover unit turn inwardly beneath the chamber 12 at their lower end to provide a horizontal throat extension 29 terminating in a port 30 in the plane of the cover flange. The upper wall 31 of the horizontal throat portion 29 terminates in a flange 32 which abuts flange 33 formed on the end of the chamber bottom wall 17. An outlet chamber or passage 34 is formed in the main trap body beneath wall 17. Such space communicates at its lower end with the main outlet port 16 and through port 30 communicates with the discharge passage 26 in the removable cover unit.

Located centrally of the side wall 24 between the discharge throat 26 and the main chamber 12 is an opening 35 surrounded on the chamber side by a boss 36 serving as the liquid discharge port for the chamber. Detachably secured to the boss by screws 37, 38 is a mounting and member 39, best shown in Figs. 2 and 5, having a central opening 40 aligned with and of the same diameter as the opening 35. Supported in the passage thus formed is a removable elongated valve seat 41 of suitable bore to properly pass the liquid to be discharged from the chamber 12 into passage 26 from whence it passes underneath the chamber 12 and out through outlet port 16. It will be appreciated that by locating the valve passage horizontally and above the bottom of the chamber, and further through the provision of the depending well 18 below the level of the sloping chamber bottom wall 17, there is no opportunity for the valve opening to become clogged.

The valve seat 41 is of a reversible type and formed for this purpose with similar ends equally suited as seats for the valve body 13. Centrally of the valve seat is a peripheral rib 42, best shown in Figs. 1 and 3, receivable in an annular recess 43 surrounding the opening 40 at the inner face of the detachable mounting 39 and held against a sealing gasket 44 at the face of boss 36. The valve seat is thus supported in the aligned openings in the boss and mounting against both rotation and longitudinal movement. By loosening screws 37 and 38 and removing member 39 the valve seat may be reversed and the parts reassembled to bring the opposite end of the seat into exactly the same position occupied by the end previously used in coaction with valve 13.

Projecting inwardly from the face of mounting member 39 over the valve seat are a pair of ears 45, 46, pivotally supporting a stub crank arm 47 to the short upper end of which is threaded the metallic spherical float 14. The shorter lower end 48 of the arm 47 is bifurcated to provide a recess 49, shown in Figure 3, in alignment with the bore of the valve seat 41.

Loosely supported in the recess 49 is the non-sticking and counterbalanced double-end valve 13, resembling a dumb-bell in general shape, specifically formed and mounted to insure positive engagement with the valve seat 41 and enabling the two ends to be reversibly used. As best shown in Fig. 3 the valve body comprises spaced and similar seat engaging end bodies 50 and 51, each of parabolic shape, interconnected by a shank 52 of substantially smaller diameter and receivable in the recess 49 of the crank arm. The spacing between the valve end body portions on the shank is slightly greater than the thickness of the crank arm and the inner faces of the spaced valve portions are beveled or rounded off, all to permit the valve to have a limited movement in the crank arm and insure that the active valve end automatically locates itself for positive engagement with the valve seal when moved to closed position. The valve shank is supported on a fulcrum in recess 49 of the arm provided by a small pin 70 positioned to allow a slight clearance between the shank and inner end of the recess so as to facilitate wabbling movement of the valve in finding its seat.

The utility of the loose fulcrum mounting of the valve 13 in the crank arm and positive seating action of the valve are in part attributable to the fact that the two ends of the valve are identical, being of the same size and weight so as to balance or counterbalance each other.

The parabolic contour of the active valve end portions 50 and 51 has two distinct advantages. Thus the seat engaging surface area of the valve has a gradual slope relative to the axis of the valve and the bore of the valve seat so that as the valve moves inwardly the curved and gradually inclined valve surface will make initial engagement with the end of the valve seat and result in any necessary shift of the valve in its mounting to insure absolute alignment with the seat as the valve moves to completely closed position. The construction is particularly advantageous where as here the valve operates in a horizonal position. It will be further appreciated that the contour of the valve is such that the same will be equally effective with valve seats of different bores. This is important in that different size valve openings are required depending on the flow in the system in which the trap is to be installed.

Another advantage of the parabolic valve shape over more conventional constructions arises from the fact that the increase or decrease in the restriction of the passage through the seat is gradual and at the same time very substantial with but a slight inward or outward movement of the valve body; and, further, the valve requires but a relatively small movement of the crank arm 47 to move the same between fully open and fully closed positions. The valve is quick acting and very sensitive to changes in level of the liquid collecting in the trap. In the illustrative trap shown in Fig. 1, the valve is mounted roughly one inch from the pivot of the crank arm. The float end of the crank arm is also very short to minimize the necessary size of the trap as previously explained and the float is of three inch diameter. Movement of the float under changes in liquid level through an arc of 35 degrees will move the valve between its full open and closed positions and any lesser movement will result in substantial change in the degree of restriction of the passage by the valve.

To insure sealing engagement with the parabolic valve body, the bored ends of the valve seat may be beveled as indicated in Fig. 3. Both the valve and valve seat are preferably made of chrome nickel non-corrosive steel to promote long life and minimize corrosion. To limit the movement of the float and valve a stop lever 53 is formed on the crank arm 49 adapted to engage the top wall of the valve seat mounting 39 when the float is raised to its maximum position, thereby preventing undue strain and sticking of the operating parts and, particularly, eliminating the possibility of the float hitting or rubbing against the upper wall of the chamber which conditions might cause denting and/or leakage of the float.

Referring again to the discharge passage 26 formed in the detachable side unit, it will be observed that the same extends well towards the upper end of the trap substantially above the float-controlled valve discharge from the main trap chamber and terminates in an enlarged portion 55 adjacent wall 54 formed by a depression 56 in the central portion of the inner passage wall 24 which projects into the main chamber 26 at a point above the level to which liquid rises in the chamber. The wall 54 is thus extended laterally to receive a threaded bore 57 in which is mounted a valve seat 58 at a point well inwardly from the end wall 25.

Located above the passage 26 and communicating therewith through the bored valve seat in wall 54 is an antichamber or alcove 59 which extends off of and is in open communication with the upper part of the end 23 of the main trap chamber 12. Supportable in the antichamber is a thermostatic valve 60 of the bellows type having at its underside a tapered valve 61 coactive with the seat 58, the valve being movable to closed position as the thermostat expands as the temperature rises in the trap. A baffle 66 extends across the trap inlet 15, serving to prevent the inflow of liquid from impinging directly on the float and, particularly, shielding the antichamber with its valve and thermostat to guard against the escape of steam before it has condensed in the chamber 12.

The upper end of the antichamber 59 is provided with a port 62 formed in the detachable side section of the trap, the same being of larger diameter than the thermostat and permitting the insertion and removal thereof. Port 62 is closed by a screw cap 63 engageable at its inner end with a flange 64 formed on the wall of the port. The upper end of the thermostatic unit 60 is secured to a plate or disc 65 of such diameter as to engage flange 64 and be clamped thereto by the screw cap, thus properly supporting the unit with the valve 61 in operative position with the valve seat 58.

From the detailed description here given it will be understood that the trap provides two separate outlets from the main chamber both communicating with a common discharge passage which extends along one end of the chamber and leads to the outlet port beneath the chamber. The lowermost main outlet port of the chamber is controlled by the float actuated valve and serves to discharge the condensate. The upper auxiliary outlet from the upper end of the chamber serves to vent accumulated air and as indicated may be controlled by a removable thermostatic valve which operates entirely independently of the float controlled liquid discharge valve.

When the trap here described is to be employed in a pressure heating system the thermostatic valve will preferably be removed and the trap will then function as a simple drip or gravity trap. As liquid and steam enter the trap chamber 12 through the inlet 15 the level of the condensate will rise to a point where the float will open the valve 13 allowing the liquid to pass out through port 35 into the discharge passage 26, thence into discharge chamber 34 and finally escape through outlet port 16. The valve opening provided between the antichamber 59 by the bore in seat 58 may be left open so as to function as a vent to bypass air accumulating in the chamber to the trap outlet. If it is found that part of the steam instead of condensing in the trap chamber escapes through the vent, the valve seat 58 can be replaced by one of smaller bore or a plug can be inserted to close the vent completely and a manually controlled valve of conventional form inserted at a suitable point in the wall of the main chamber to provide for the escape of air and prevent the building up of undesired pressure.

For use in vacuum heating systems the thermostatic valve unit will be inserted in place in the antichamber 59 and will thus function to automatically control the escape of air from the trap when placed in operation. As the heat of the trap chamber increases with the entrance of uncondensed steam, the thermostatic valve will close to prevent the escape of the steam through the air bypass vent. It will be noted that while the thermostat is built into the trap and in communication with the main chamber it is protected in the antichamber by baffle 66 against exposure and undesired response to the steam as it first enters the trap. In the present device the operation of the float controlled liquid discharge valve is the same in both vacuum and pressure systems and it will be evident that the general operation of the trap is entirely independent of the presence or absence of the thermostatic valve.

In case the trap requires cleaning or repair the detachable side unit 11 may be removed without disturbing the pipe connections to the main trap body 10. The detachable unit carries all the operating parts of the trap including the main discharge valve and seat, the bellcrank valve mounting and float, and the thermostatic air venting valve, and when removed exposes all such parts for inspection, reversal of the reversible discharge valve and seat, or adjustment, cleaning and inspection.

I claim:

1. A steam trap comprising a main casing body and a detachable side section enclosing a trap chamber, an inlet in the wall of the main body opening into the chamber, an outlet port in the lower end of the main casing body, a passageway formed in the side cover section communicating with the outlet port in the main casing body, a discharge port extending through the inner wall of said passageway and communicating with the trap chamber, a valve for said discharge port and float actuating mechanism therefor supported by the removable side casing section in the trap chamber, a side chamber formed in the removable side casing section in free communication with the upper part of the main trap chamber, and an air vent in the wall of said side chamber communicating with the passageway.

2. A steam trap comprising a main casing body and a detachable side section enclosing a trap chamber, an inlet in the wall of the main body opening into the chamber, an outlet port in the lower end of the main casing body, a passageway formed in the side cover section communicating with the outlet port in the main casing body, a discharge port extending through the inner wall of said passageway and communicating with the trap chamber, a valve for said discharge port and float actuating mechanism therefor supported by the removable side casing section in the trap chamber, a side chamber formed in the removable side casing section in free communication with the upper part of the main trap chamber, an air vent in the wall of said side chamber communicating with the passageway, and a thermostatic valve for said air vent carried by the detachable side section.

FREDERICK R. DUNN.